Figure 1:
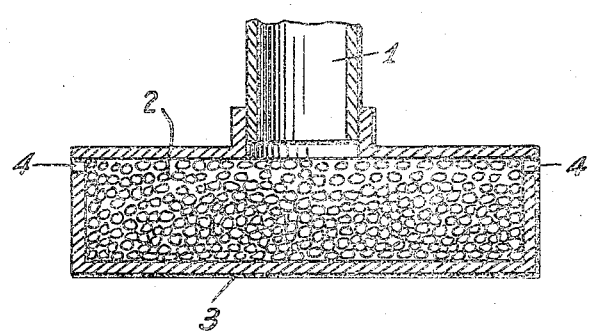

Patented June 20, 1933

1,914,665

UNITED STATES PATENT OFFICE

WILLIAM P. HASEMAN, OF OKLAHOMA CITY, OKLAHOMA, AND JOHN D. HASEMAN, OF LINTON, INDIANA; SAID WILLIAM P. HASEMAN ASSIGNOR TO JOHN D. HASEMAN

METHOD OF BREAKING PETROLEUM EMULSIONS

Application filed October 13, 1930. Serial No. 488,272.

This invention relates to a method of and apparatus for breaking down emulsions in general and collecting the component parts thereof and has particular reference to breaking down oil-water and water-oil emulsions and collecting the oil and water.

Emulsions formed in the production of oil are generally classed in two groups, (1) water in oil emulsions and (2) oil in water emulsions. The former group is by far the more common. It consists of minute globules of water encased and supported in a mass of oil while the latter group consists of minute globules of oil encased and supported in a mass of water. Some emulsions break down readily while others are very resistant to the usual methods of treatment which consists of heat, electrical, chemical and mechanical, or a combination of them.

A method of treatment may either alter the shape and character of the globules, reduce the tension of the encasing films of the globules, alter the relative specific gravity of the globules and the suspending liquid, and alter the viscosity of the suspending liquid. If the method of treatment affects favorably any one or all of these factors which produce the emulsion it will aid to break down and separate the component parts of the emulsion.

Our invention has for its primary object the breaking down and removing of the liquid films which form and hold the globules and the contacting of the globule with and the removing of it in a similar and like liquid with little or no agitation. The films are broken down by contacting them with concrete objects or granules with surface characteristics and under proper conditions such as will by a single or by an integrated action remove the films and permit the globules to contact and become a part of a like and miscible liquid. To effect the operation of our method there must be present emulsion globules, liquid of like and miscible nature to the liquid globules and granules to contact and distort the form of the globules and to effect a differential speed of the emulsion globules and the liquid.

We have discovered that when the emulsion globules, the liquid and the granules are confined in a container in the proper proportions and the container is rotated slowly thereby causing the granules to contact the globules, distort the form of the globules and move them with a differential speed on the surface of the liquid, the emulsion is broken down and the oil and water are separated. In the treatment of oil-water and water-oil emulsions the liquid is preferably water. The water may be either fresh or salt water and is in considerable excess to the emulsion. The oil in the emulsion collects and floats on the water while the water part of the globules is miscible in the water. The granules may be small pebbles or of any solid material, but preferably of a porous material which wets easily with the liquid and from whose surface oil is easily washed or removed by the liquid. Tripoli granules and granules of a similar character have been found to give good results. This method is made continuous in operation by arranging to continuously flow the emulsion and liquid in one end of the rotating container and out at the other end.

We have also discovered that when the granules are packed in a container to form a contact bed through which the emulsion and liquid are flowed in the proper proportions without agitation an effective breaking down of the emulsion is consummated. The contact bed may have either a circular cross section formed by packing the granules in a cylindrical tube through which and along the axis of which the emulsion and liquid flow; a rectangular cross section as a shallow box; or a circular cross section as a shallow tank with the emulsion and liquid flowing out radially through the contact bed. In these arrangements since the emulsion and the associated oil have a greater viscosity and a smaller specific gravity than the liquid (water), they are forced by the action of the large excess of the liquid to flow through the upper part of the contact bed, thus forming and maintaining under controlled flow conditions a definite contact surface between the emulsion and liquid. The emulsion globules are forced to contact rather intimately the granules of the contact bed and the closely associated liquid, distort their form and flow with a differential speed to the liquid, thereby breaking down the emulsion. The oil separating therefrom flows out or is carried out of the contact bed on the surface of the liquid while the water from the globules is miscible in the liquid. The relative amounts of emulsion and liquid to be flowed through the contact bed, the pressure or speeds of the fluids, the kind, size and shape of the granules forming the contact bed and the thickness and length of the contact bed are factors among others which affect the efficiency of the operation of the contact bed and flow method. The method works well with a rather wide variation of these factors.

The quantity of the emulsion should in general be much smaller than the quantity of the liquid flowed into and through the contact bed so that the emulsion forms essentially a thin film like layer in the uppermost part of the contact bed and the liquid fills the remaining parts of the contact bed. This thin layer of emulsion moves very slowly through the contact bed, contacting the granules and liquid, bringing about an effective breaking down of the emulsion and the removal and collection of the component parts thereof. The kind and shape of granules preferred is tripoli of four to forty mesh, although other sizes and kind of materials may be used. The granular material may be made more active by chemicals and chemical treatment. For example the porous tripoli or other material may be treated and saturated with phenol or other chemicals which in small quantities are known to aid in breaking down emulsions. It is also contemplated in certain cases to use heat either applied directly to the contact bed or to the emulsion and liquid as an aid to the breaking down of the emulsion. The contact bed should in general be either rectangular or cylindrical in shape with the flow in the cylindrical bed radially. The flow should in general take place in a horizontal direction. The contact bed should be preferably one to six inches in thickness and three to six feet in length.

Figure 2:
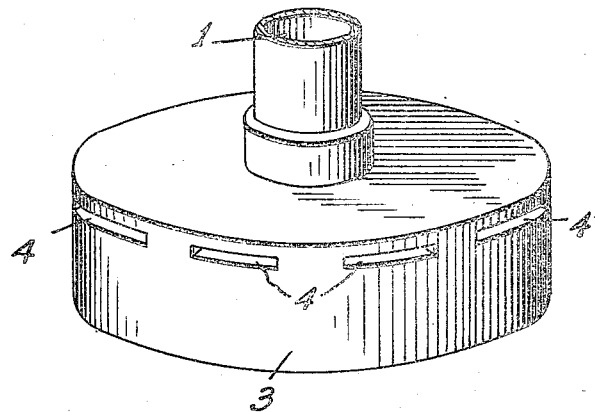

Figures 1 and 2 give a diagrammatic sketch of the preferred form which the apparatus may have. In Figure 1 the numeral 1 represents the tube through which the emulsion and liquid enter the contact bed which is represented by numeral 2; numeral 3 represents the container for the contact bed and numeral 4 the openings in the container through which the fluids flow from the container. The oil and liquid are flowed from the container through the slot like openings near the top of the container into a suitable collecting tank where the oil collects and floats on top of the liquid. The oil is removed from the collecting tank. Figure 2 gives the container of the contact bed in perspective and shows the slot like openings 4 near the top of the container through which the liquid and component parts of the emulsion flow from the container. Numeral 1 shows the tube through which the fluids enter the contact bed.

The apparatus may be used as the case warrants in the gas-oil separator tank, in the treating tank, in and to a flow line with special collecting reservoir or to a flow line so that the fluid passes through the contact bed and is collected from the slots and discharged into the flow line.

We claim:

1. The method of separating a naturally occurring petroleum emulsion into its constituent parts which comprises mixing the emulsion with a large excess of salt water, passing the mixture thru a bed of granular material, of such dimensions that the mixture flows thru a constantly increasing cross-section of granular material, whereby the velocity of the liquid flow is constantly reduced and withdrawing the constituents of the emulsion.

2. The method of separating naturally occurring petroleum emulsion into its constituent parts which comprises mixing the emulsion with a large excess of salt water, passing the mixture thru a bed of granular tripoli, of such dimensions that the mixture flows thru a constantly increasing cross-section of granular tripoli, whereby the velocity of the liquid flow is constantly reduced, and withdrawing the constituents of the emulsion.

3. The method of separating a naturally occurring petroleum emulsion into its constituent parts which comprises mixing the emulsion with a large excess of salt water, passing the mixture thru a bed of small pebbles of substantially uniform diameter, of such dimensions that the mixture flows thru a constantly increasing cross-section of the bed, whereby the velocity of the liquid flow is constantly reduced, and withdrawing the constituents of the emulsion.

4. The method of separating a naturally occurring petroleum emulsion into its constituent parts which comprises mixing the emulsion with a large excess of salt water, passing the mixture thru a bed of granular material treated with phenol, of such dimensions that the mixture flows thru a constantly increasing cross-section of granular material, whereby the velocity of the liquid flow is constantly reduced, and withdrawing the constituents of the emulsion.

5. The method of separating a naturally occurring petroleum emulsion into its constituent parts which comprises mixing the emulsion with a large excess of salt water, passing the mixture thru a bed of granular material of 4 to 40 mesh, of such dimensions that the mixture flows thru a constantly increasing cross-section of granular material, whereby the velocity of the liquid flow is constantly reduced, and withdrawing the constituents of the emulsion.

6. The method of separating emulsions into their constituent parts which comprises mixing the emulsions with an excess of the disperse phase, passing the mixture thru a bed of granular material, of such dimensions that the mixture flows thru a constantly increasing cross-section of granular material, whereby the velocity of the liquid flow is constantly reduced, and wherein the mixture is introduced along the axis of a bed which constitutes a cylinder, and wherein the constituents issue from the periphery of the cylinder, and withdrawing the constituents of the emulsions.

In testimony whereof we affix our signatures.

WILLIAM P. HASEMAN.
JOHN D. HASEMAN.